United States Patent [19]

Engler et al.

[11] Patent Number: 5,569,441
[45] Date of Patent: Oct. 29, 1996

[54] SYSTEM FOR ACCELERATING THE HEATING RATE OF A FIXED BED CATALYST BY SUPPLYING SUPPLEMENTAL ENERGY

[75] Inventors: Bernd Engler, White Plains, N.Y.; Egbert Lox, Hanau; Andreas Niemann-Weber, Rheinfelden, both of Germany

[73] Assignee: Degussa Aktiengesellschaft, Frankfurt am Main, Germany

[21] Appl. No.: 341,198

[22] Filed: Dec. 5, 1994

[30] Foreign Application Priority Data

Dec. 4, 1993 [DE] Germany ............... 43 41 380.3

[51] Int. Cl.[6] ............... B01D 53/34; F01N 3/10
[52] U.S. Cl. ............... 423/212; 423/213.2; 422/173; 422/177; 422/179; 422/198; 422/211; 422/221; 422/222; 422/180; 60/300
[58] Field of Search ............... 422/173, 177, 422/178, 179, 180, 181, 182, 183, 198, 211, 221, 222; 60/275, 300; 55/DIG. 10, 212; 423/213.2; 206/157.41, 157.47; 219/552, 553; 392/485, 491, 494

[56] References Cited

U.S. PATENT DOCUMENTS

| | | | |
|---|---|---|---|
| 3,770,389 | 10/1973 | Kitzner et al. | 60/300 |
| 5,140,813 | 8/1992 | Whittenberger | 422/174 |
| 5,174,826 | 12/1992 | Mannava et al. | 118/719 |
| 5,180,559 | 1/1993 | Ma | 422/168 |

FOREIGN PATENT DOCUMENTS

| | | | |
|---|---|---|---|
| 465184 | 1/1992 | European Pat. Off. | 60/300 |
| 3835939 | 5/1989 | Germany . | |
| 4035971 | 5/1990 | Germany . | |
| 354312 | 1/1992 | Japan | 60/300 |
| 610654 | 1/1994 | Japan | 60/300 |
| 6159047 | 6/1994 | Japan | 60/300 |
| 2084898 | 4/1982 | United Kingdom | 60/300 |
| 2264242 | 8/1993 | United Kingdom | 60/300 |
| 90/14507 | 11/1990 | WIPO . | |

OTHER PUBLICATIONS

SAE Technical Papers Series 930384, Optimization Of An Electrically-Heated Catalytic Converter System Calculations and Application, 1993.

SAE Technical Papers Series 930383, Reduction Energy and Power Consumption for Electrically Heated Extruded Metal Converters, 1993.

*Primary Examiner*—Robert J. Warden
*Assistant Examiner*—Hien Tran
*Attorney, Agent, or Firm*—Beveridge, DeGrandi, Weilacher & Young

[57] ABSTRACT

A process and apparatus for accelerating the rate of heating of a fixed bed catalyst to a light-off temperature for a catalytic reaction is disclosed. Supplementary energy from an external energy source is provided to a predetermined area of the catalyst bed for a limited period of time. The fixed bed catalyst may be present as a solid body or in bulk form and has a gas inlet area defined by a cross-section of the flow through channels of the reaction media. The supplementary energy is supplied to one or more isolated sections of the gas inlet area of the catalyst. Such a system significantly reduces the energy required in order to effectuate at least partial conversion of harmful emissions during initial operation of the converter.

10 Claims, 5 Drawing Sheets

SYSTEM FOR ACCELERATING THE HEATING RATE OF A FIXED BED CATALYST BY SUPPLYING SUPPLEMENTAL ENERGY

BACKGROUND OF THE INVENTION

The present invention relates to enhancing the operation of a catalytic converter and, in particular, to a process and apparatus for accelerating the rate of heating of a fixed bed catalyst to the light-off temperature for a catalytic reaction by supplying supplementary energy from an external energy source for a limited time period. A fixed bed catalyst within the converter may be present in a solid body or in a bulk form. The catalytic carrier within the converter has an exhaust gas inlet area defined by a cross-section of the catalyst carrier bed flow channels.

A typical field of use for such a process is catalysis of car exhaust gases. Modern three-way catalytic car exhaust gas converters usually consist of catalytically active coatings on a honeycomb-structured carrier made of ceramic or metal. Such converters can convert up to 90% of harmful substances contained in car exhaust gases, such as carbon monoxide (CO), hydrocarbons (HC) and nitrogen oxides ($NO_x$), into the non-toxic substances water, carbon dioxide and nitrogen. Such conversion, however, only takes place after a catalyst within the converter has reached its particular operating temperature (typically between 400° and 1000° C.) and that the exhaust gas has a correct chemical composition as a result of proper regulation of the fuel/air ratio.

During the initial stages of a cold start, however, the harmful substances may pass through the still inactive catalyst without being converted. When a so-called "light-off" temperature is reached, conversion of approximately 50% of the harmful substances takes place. The light-off temperature is dependent on the catalyst formulation and on the type of harmful substance(s) being converted. In the case of car exhaust catalysis, the light-off temperature is typically in the range of 250° to 400° C. The duration of the cold start phase, between the initial start-up and achieving the light-off temperature, usually takes about 200 to 300 seconds.

Depending on the nature of a particular use (i.e., long or short-distance driving) harmful substance emissions during the cold start phase may constitute the majority of the total harmful vehicle emissions for a particular use. Hence, it is advantageous to heat the catalyst as quickly as possible. Passive and active techniques have previously been proposed for accelerating the heating of a catalyst in order to reduce emissions. Passive measures include locating the catalyst as close as possible to the internal combustion engine, insulating the exhaust gas system against heat losses, and reducing the heat capacity of the exhaust gas system. Proposed active measures have included supplying supplemental energy to the catalytic system during the cold start phase in the form of microwave energy (PCT WO 90/14507) or in the form of electric heat.

Typical systems related to electrically heated catalytic converters are described in SAE publications SAE 930 383 "Reduced Energy and Power Consumption for Electrically Heated Extruded Metal Converters", and SAE 930 384 "Optimisation of an Electrically Heated Catalytic Converter System: Calculations and Application".

In prior electrically heated systems, catalytic elements consisting of a metal honeycomb structure acts as a carrier for a catalytically active coating. An electric current is passed through the metal structure to produce a heating effect. Electric power of 1500 W per 50 g weight of metal honeycomb structure is typically required to heat a catalyst in such a system to a light-off temperature of 400° C. within 10 seconds. In an attempt to reduce the amount of electrical power required, it has been proposed that a catalyst be provided which is designed to be effective only as a start-up catalyst. Such a start-up catalyst heating arrangement is located upstream of a main catalyst portion which performs conversion following start-up.

German Patent Publication DE-OS 40 35 971 describes a heatable catalyst arrangement for the purification of exhaust gas from an internal combustion engine which arrangement consists of a first portion having a part-catalyst, a subsequent electrically heated catalyst portion which is further connected in series to another part-catalyst portion. However, the heated catalytic system according to DE-OS 40 35 971, like all catalytic arrangements which heat the catalyst by passing current through a conductive carrier, is susceptible to deterioration of electrical contacts and conductive paths which occurs during normal operation. Furthermore, depositions on the metallic carrier can lead to corrosion, faulty contacts and short-circuits. Another important problem is that electrically heated catalyst systems draw significant amounts of current, typically between 100 to 500 A, from the vehicle battery. This current drain reduces battery life and requires additional wiring and the corresponding additional complexities and resistance losses relating thereto. In many cases, the high energy requirements of electrically heated catalyst systems necessitates the installation of a second vehicle battery dedicated strictly to the catalyst heating system.

The object of the present invention is to provide a system for accelerating the rate of heating of a fixed bed catalyst by supplying supplemental energy to heat a predetermined portion of a catalyst bed in such a manner that the total energy required to achieve the desired affect is substantially reduced when compared to that required in prior art systems. The present invention also is suitable for use with catalyst carriers comprised of ceramics, or other non-conducting materials.

SUMMARY OF THE INVENTION

The aforementioned and other objects of the invention are achieved by accelerating the rate of heating of a fixed bed catalyst to the light-off temperature for the catalytic reaction by supplying supplementary energy from an external energy source, or sources, to an exhaust gas inlet area, or areas, for a relatively short period time. The fixed bed catalyst carrier having catalyst embedded therein may be present as a solid body, or in bulk form. The catalyst carrier has a defined gas inlet area at which exhaust gases enter the reaction media. Such an exhaust gas inlet area is defined by a cross-section of catalyst bed flow channels. It was learned that conversion of toxic emissions can be significantly enhanced during start-up by applying a relatively small amount of heat energy to one or more specific areas of the exhaust gas inlet portion of the catalytic reaction material.

The system is characterized by the provision of supplementary energy to only one or more isolated sections of the gas inlet area of the catalyst section of the converter. The targeted sections are of such a size that the sections can be heated to the light-off temperature within a specified activation period, taking into account heat losses due to conduction, convection and radiation.

The invention was derived, in part, from thermographic tests of heating catalysts during the cold start phase. These tests produced the surprising result that the gas inlet area of the catalytic converter is not uniformly heated. Rather, it was learned that the conversion of harmful substances initially occurs over a confined portion of the gas inlet area, and then rapidly spreads to the whole gas inlet area of the catalytic converter as a result of exothermic reaction after which conversion reactions spread into the core of the converter until the entire catalyst volume is active having reached operating temperature.

The present invention takes into account these findings by rapidly initiating the conversion reaction in an isolated section, or sections, of the exhaust gas inlet portion of the catalyst bed where conversion reactions first begin. This is accomplished by supplying supplemental energy to heat the section, or sections, after which the conversion reaction spreads from the heated section, or sections. Hence, the conversion reaction is enhanced and accelerated by the supplemental heating of the initial conversion reaction areas, and the catalytic converter is able to process emissions sooner.

As envisioned, a supply of supplemental energy is fed from an external source, or sources, which delivers energy with power P. The external source heats a section, or sections, of the exhaust gas inlet area in the converter from an ambient temperature $T_a$ to a light-off temperature $T_1$ within activation period t. The area, or sum of areas, of the heated sections is represented by F. The area F is given by the expression:

$$F = \frac{\eta \cdot P \cdot t}{(T_1 - T_a)} \quad (1)$$

Where the constant $\eta$ factors in the efficiency with which the power P from the external source of energy is supplied to the section(s), and the propagation of heat from the heated sections due to convection and conduction by the catalyst structure. The constant also takes into account heat losses due to heat radiation.

Because the area to be heated is dependent upon the nature of the materials which make up the catalytic converter, that is the catalyst carrier, the catalyst itself, and any insulation or surrounding housing, the relationship between these factors can be complex. Calculating the coefficient may be done by measuring the temperature rise of a section F for a specific combination of the parameters P, t, $T_a$ and $T_1$. Likewise, the constant $\eta$ can also be determined by experiment wherein for known values of F, P, t, $T_a$ and $T_1$, $\eta$ can be determined. As such, $\eta$ would be given by the formula:

$$\eta = \frac{F(T_1 - T_a)}{(P)(t)} \quad (2)$$

Ideally, the activation time t should be restricted to about 10 to 20 seconds. With this proviso, the size of the sections to be heated can be roughly calculated by applying formula (1) and inserting values for the power P available from the external source of energy, the experimentally determined constant $\eta$, and the light-off temperature $T_1$ required.

The sum of the sections to be heated, F, should comprise 0.01 to 20% of the catalyst material gas inlet area. If it is desired, the supply of energy can be continued beyond the activation time, but due to the presence of hot exhaust gases, such continuation essentially no longer contributes to heating the catalyst.

Any system for supplying energy in the form of heat or for heating an area, or areas, is suitable for the present invention. Exemplary arrangements include irradiating the catalytic material inlet portion with a source of thermal radiation such as welding lamp(s) which are commercially available with fixed or variable rated power ratings. These are typically halogen lamps having integrated parabolic, ellipsoidal, or reflector mirrors coated with infra-red-reflecting metal layers. Another possible source is a laser which irradiates the section, or sections of gas inlet area via a fiber optic wave guide or bundle. Due to their high efficiency and compact construction, semiconductor lasers are particularly suitable for this purpose. As an alternative to providing supplementary energy in the form of electromagnetic radiation, jets of hot air also can be used. Such an arrangement might be provided by simply using a fan, heat spiral, and nozzle which direct heated air or gas onto the intended section, or sections, of the gas inlet area. In a preferred embodiment, however, radiation emitted by laser light sources or by welding lamps is used to heat the catalyst.

The spectrum of emitted radiation is of secondary importance. Radiation from the entire visible spectrum and from the region of thermal radiation can be used, i.e. electromagnetic radiation with wavelengths between 0.3 and about 12 μm. However, it is desirable that the main emission is in a region corresponding to the absorption bands of the catalyst material. The porous structure of the catalyst material and the usual honeycomb design of the catalyst carrier, however, ensure that even the fraction of radiation which lies outside the absorption bands of the solid catalyst material is nearly entirely converted into heat in a thin surface layer, due to scattering and multiple reflections in the flow channels of the catalyst material honeycomb structure.

The process and apparatus according to the present invention are characterized by significantly lower energy requirements than those required by prior art systems. The energy required by the present system is typically only 1 to 10% of that required for known electrically heated catalytic converters. However, the present invention has an additional advantage of being capable of supplying supplemental energy, in the form of electromagnetic radiation or jets of hot air, in systems having ceramic or non-conductive, rather than metallic, catalyst carriers. The present system, unlike prior art systems, does not propagate current through a metallic catalyst carrier. Hence, the corresponding problems, such as corrosion and electrical contact deterioration, can also be avoided if a non-conductive catalyst carrier is used in combination with the present invention.

Determination of the number of sections to be heated is based, in part, on the size of the exhaust gas inlet area of the catalyst material within the converter. Up to a diameter of about 75 mm, heating a single central area of the flow surface with supplemental energy is sufficient to successfully accelerate the heating process in the catalyst. For larger cross-sections, it is recommended that heat treatment be applied to 3 or more sections. In order to ensure that the catalyst is heated as uniformly as possible, the sections should be arranged in a suitable pattern such as a square or hexagonal grid.

Heating of the sections may be carried out by individual energy sources for each section. It is also possible, however, to heat each section from a single correspondingly larger energy source by using suitable distribution components. In the case of electromagnetic radiation, such a distribution system may be a multi-armed bundle of optical fibers, or a lens array. When using jets of hot air, a fan and a heating spiral can simultaneously supply heated air or gas to several nozzles.

Essentially, what is disclosed is a catalytic converter which provides enhanced emission conversion during start-up, wherein the catalytic converter comprises a gas tight housing having an inlet and an outlet; a catalyst carrier arranged within the housing between the inlet and the outlet such that exhaust gases pass through gas flow channels within the catalyst carrier. The catalyst carrier has a gas inlet area defined by a cross-section of the gas flow channels. A supplemental energy source is connected to the housing for directing energy to a portion of the gas inlet area of the catalyst carrier in order to heat that portion to a light-off temperature of the catalyst. The light off temperature depends on the particular catalyst used and the materials which make up the catalyst carrier. The energy need only be delivered for a brief period during start-up.

Also disclosed is a process for enhancing emission conversion in a catalytic converter during cold-start, which process comprises providing a catalytic converter having a catalyst carrier, and a supplemental energy delivery source; directing energy from the supplemental energy source to a predetermined portion of a gas inlet area of the catalyst carrier; heating that portion of the gas inlet area for a predetermined period of time to allow the portion to achieve light-off temperature.

Other objects and advantages of the invention will become readily apparent from the drawings and detailed description set out below.

DETAILED DESCRIPTION OF THE PREFERRED EMBODIMENTS

Figure 1:
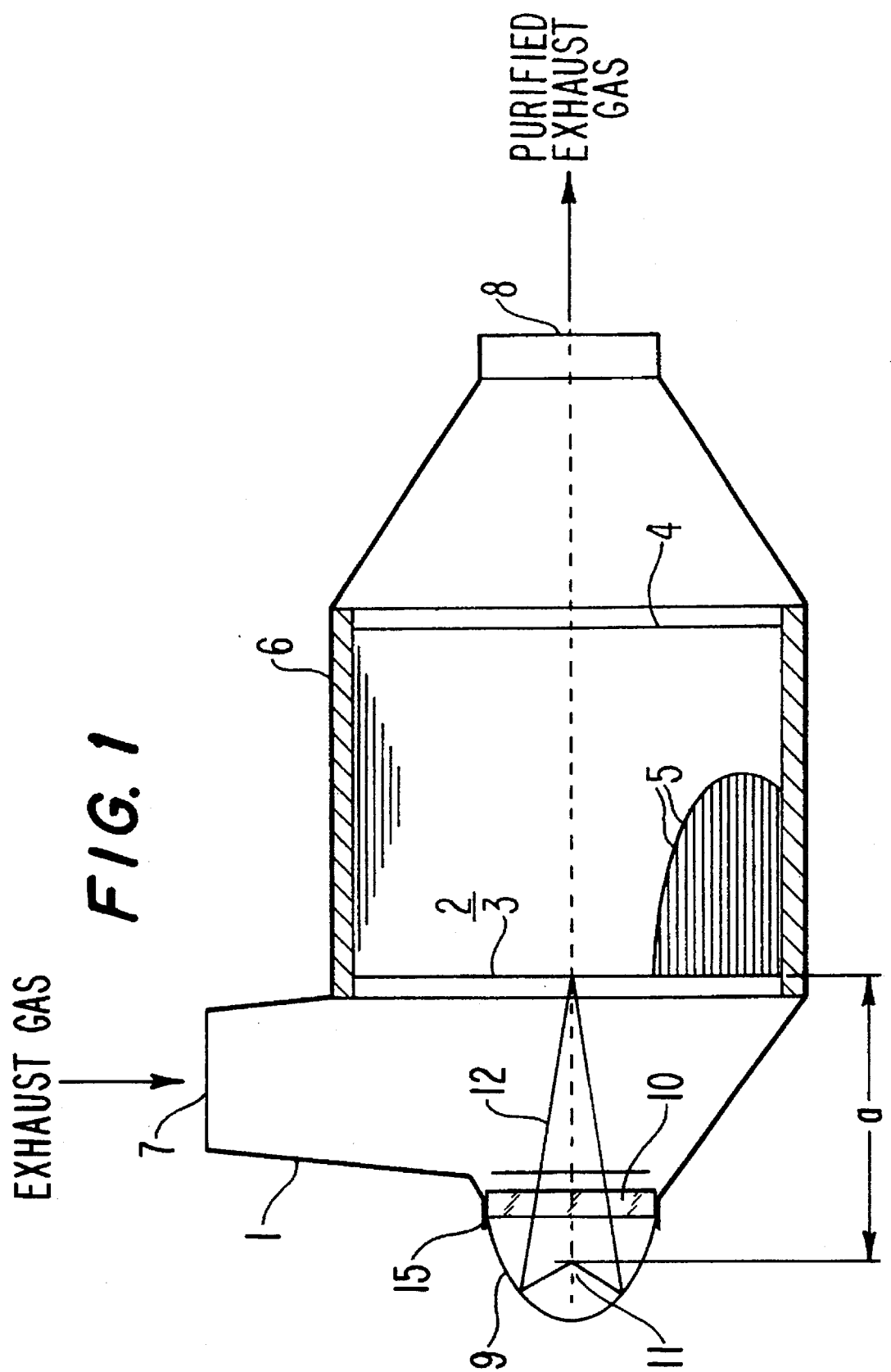
FIG. 1 is a schematic cross sectional view of a first embodiment of the present invention.

Turning now to the figures, FIG. 1 shows a schematic cross sectional view in partial section of an exemplary embodiment wherein supplemental heating is provided to the exhaust gas inlet area of a three-way catalytic converter on a typical ceramic solid support made of, for example, cordierite with 62 cells/cm$^2$ by means of a 50 watt welding lamp.

The catalyst is contained in an inert ceramic honeycomb carrier 2 which is fixed in the converter housing 1 by means of heat-insulating, shock-absorbing and gas-tight fiber matting 6. The housing 1 can be made of any conventional material known in the art for this purpose. Exhaust gases enter the ceramic carrier 2 via its entrance surface 3 and exit through its exit surface 4. Within the ceramic carrier 2, exhaust gases pass through parallel flow channels 5. The entrance surface 3 and the exit surface 4 are cross sections of the ceramic carrier 2. In the depicted embodiment, exhaust gas is fed to the converter housing laterally via an entrance opening 7 and exits the converter in a purified condition via the exit opening 8. Honeycomb and catalyst technology is a highly developed art and any suitable material, compositions and designs can be used for purposes of the present invention.

In the embodiment depicted in FIG. 1, the center of the entrance surface 3 of the ceramic solid is illuminated and heated by a welding lamp or halogen lamp 9. The welding lamp 9 is flange-mounted to the converter housing via a window 10 made of high temperature resistant glass. An ellipsoidal mirror on the welding lamp is shaped so that distance "a" from the welding lamp 9 to the entrance surface 3 of the ceramic solid 2 is such that radiation 12 emitted by a spiral-wound filament 11 is focused onto the entrance surface 3. If required, the illuminated area on the entrance surface 3 of the ceramic solid 2 can be changed by increasing or decreasing the distance between the filament 11 and the entrance surface 3, or by altering the shape of the elliptical mirror 15.

In the depicted arrangement, it is typical for about 30% of the electric power supplied to the lamp 9 to be focused onto the illuminated area in the form of visible and infra-red electromagnetic radiation. If an arrangement of materials corresponding to a constant η having a value 0.8 cm$^2$K/Ws is selected for a desired area, F, of about 1 cm$^2$, which is to be illuminated when a surface temperature of 400° C. is to be achieved within 10 seconds, the corresponding lamp power required is about 50 W.

Application of such heat to the entrance surface will result in some of the heat being dispersed into the ceramic carrier 2. The extent of the depth of the heated volume can be calculated as being about 0.5 cm from the material data for the solid catalyst ($C_p$=0.836 J/gK; ρ=720 g/l [560 g/l from the ceramic solid and 160 g/l from the catalytic coating]) and the duration of irradiation, the temperature rise and the power supplied. The heating process of the catalyst is supported by the processes which in practice occur at the same time; the exhaust gases becoming hotter and the exothermic reactions being finally initiated.

Figure 2:
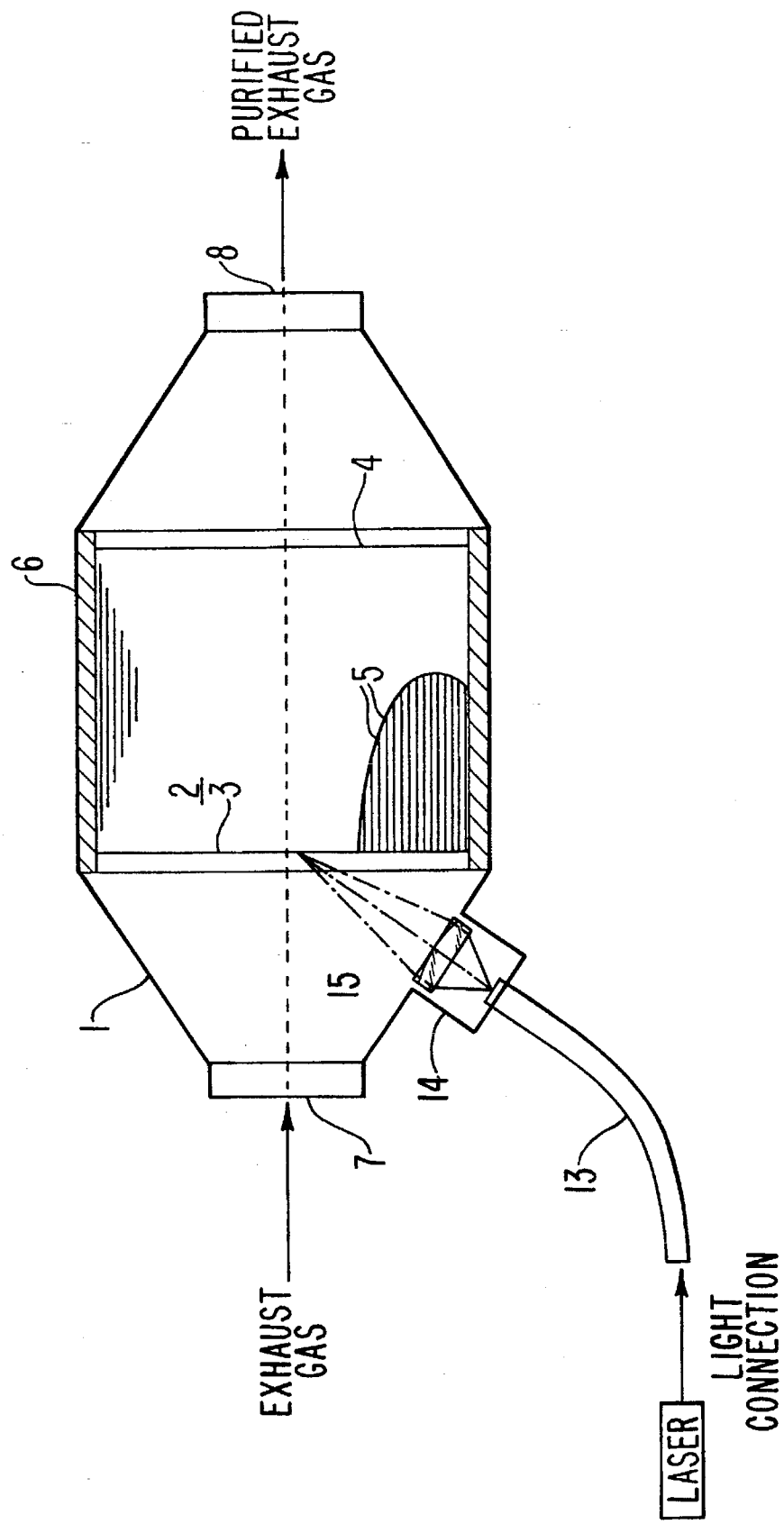
FIG. 2 is a schematic cross sectional view of a second embodiment of the present invention.

A second embodiment is depicted in FIG. 2 wherein the supplementary energy is supplied by means of a laser light source. Radiation from the laser light source is routed via a flexible fibre optic light guide 13 which is fixed to a receiving device 14 of the converter 1. Use of the flexible fiber optic light guide 13 enables a heat-sensitive semiconductor laser to be located in a position which is remote from the hot converter. The receiving device 14 contains a lens 15 made of high temperature resistant glass which focuses the radiation at a desired area on the entrance surface 2. The lens is hermetically sealed so as to prevent gases from escaping from the converter. In this particular arrangement, an area of 0.1 cm$^2$ can be heated to 400° C. within about 10 seconds by using a semiconductor laser having 2 W power. The corresponding extent of the depth of the heated volume is about 0.4 cm.

Figure 3:
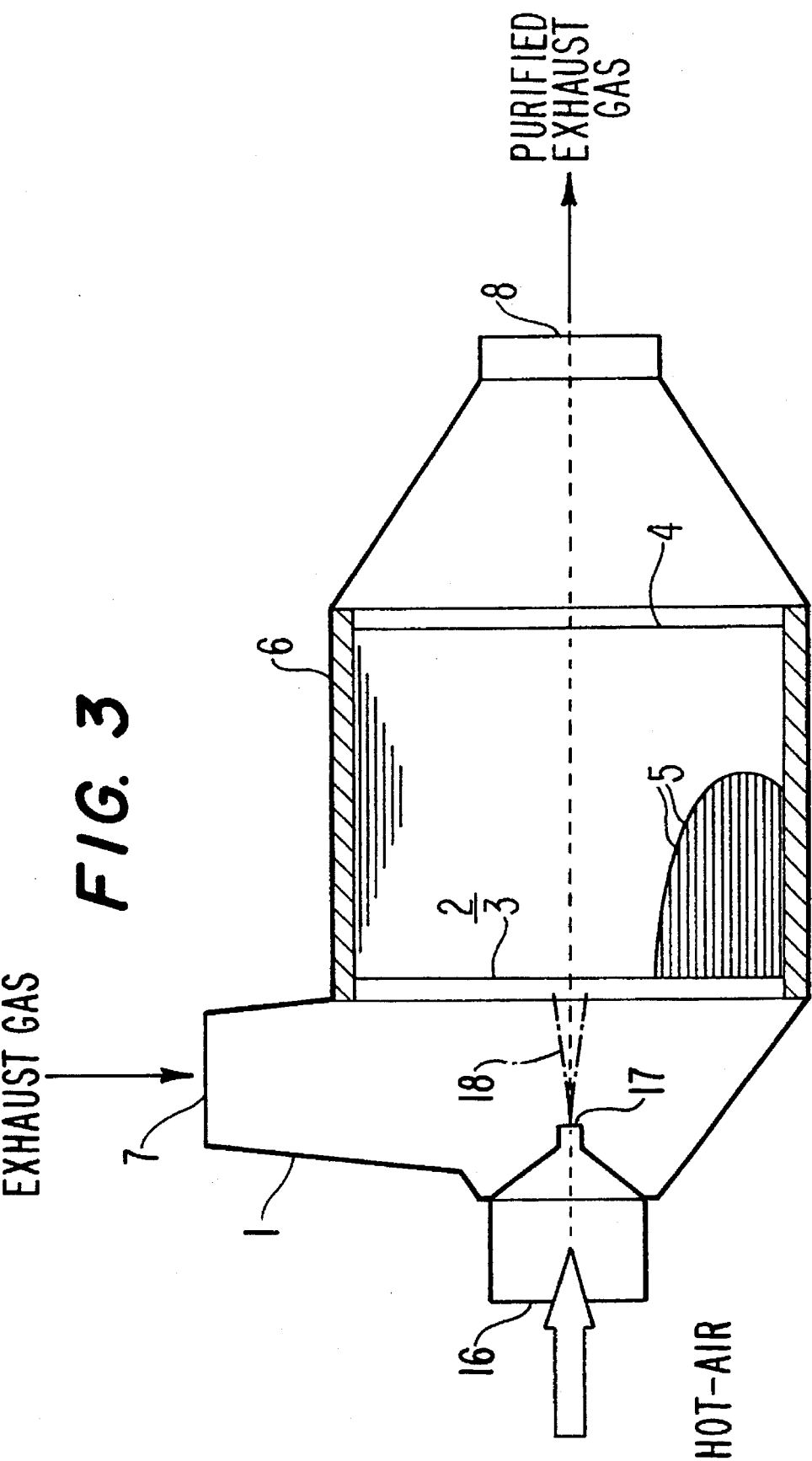
FIG. 3 is a schematic cross sectional view of a third embodiment of the present invention.

FIG. 3 shows a third embodiment wherein a hot air nozzle 17 is used for heating a small area in the center of the entrance surface 3 of the ceramic solid 2 with a jet of hot air 18 ducted via nozzle entrance opening 16.

Figure 4:
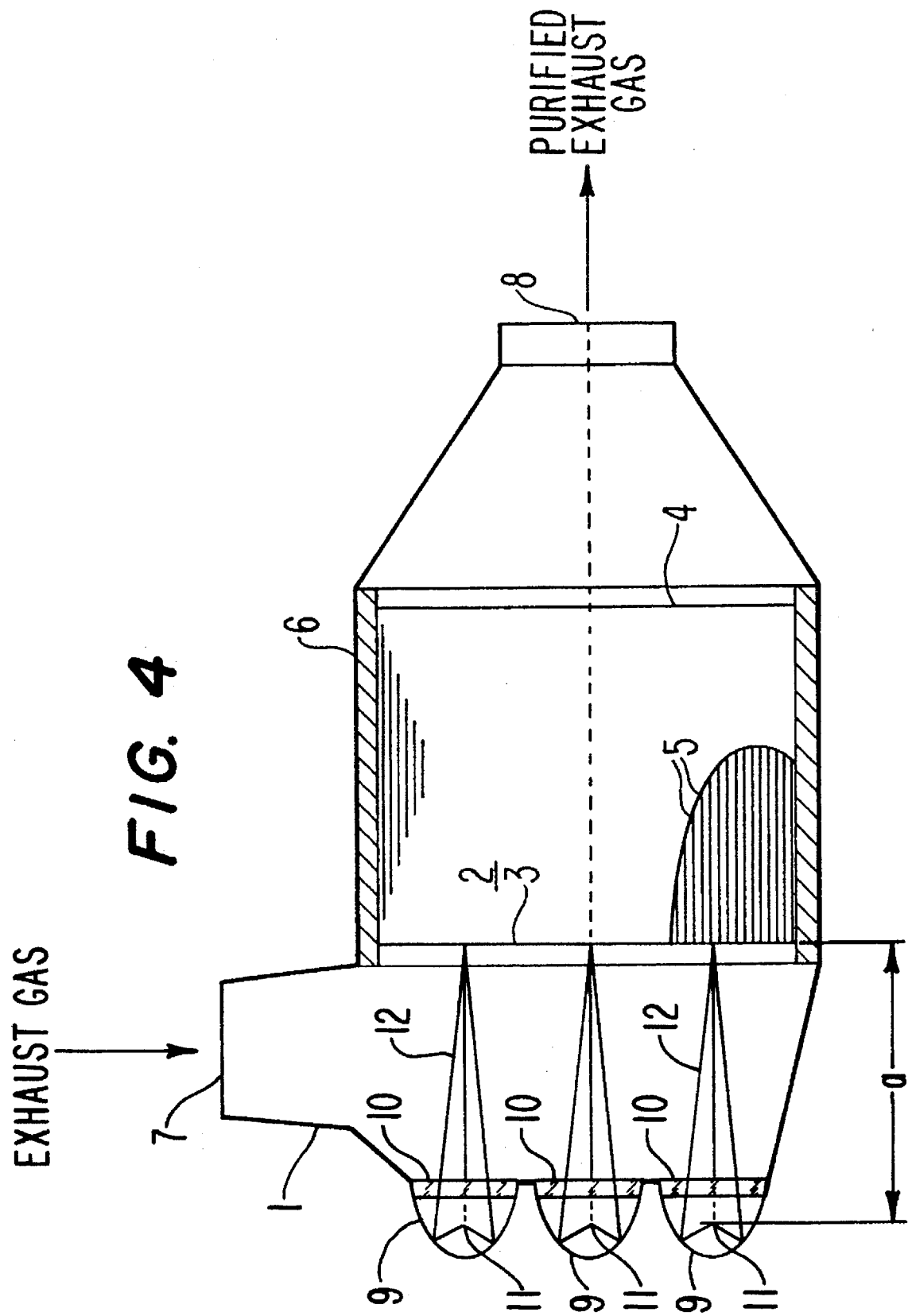
FIG. 4 is a schematic cross sectional view of a fourth embodiment of the present invention.

FIG. 4 shows a fourth embodiment, wherein three halogen lamps 9 are utilized to provide a plurality of energy sources, each of which heat isolated portions of the catalyst carrier entrance surface 3.

Figure 5:
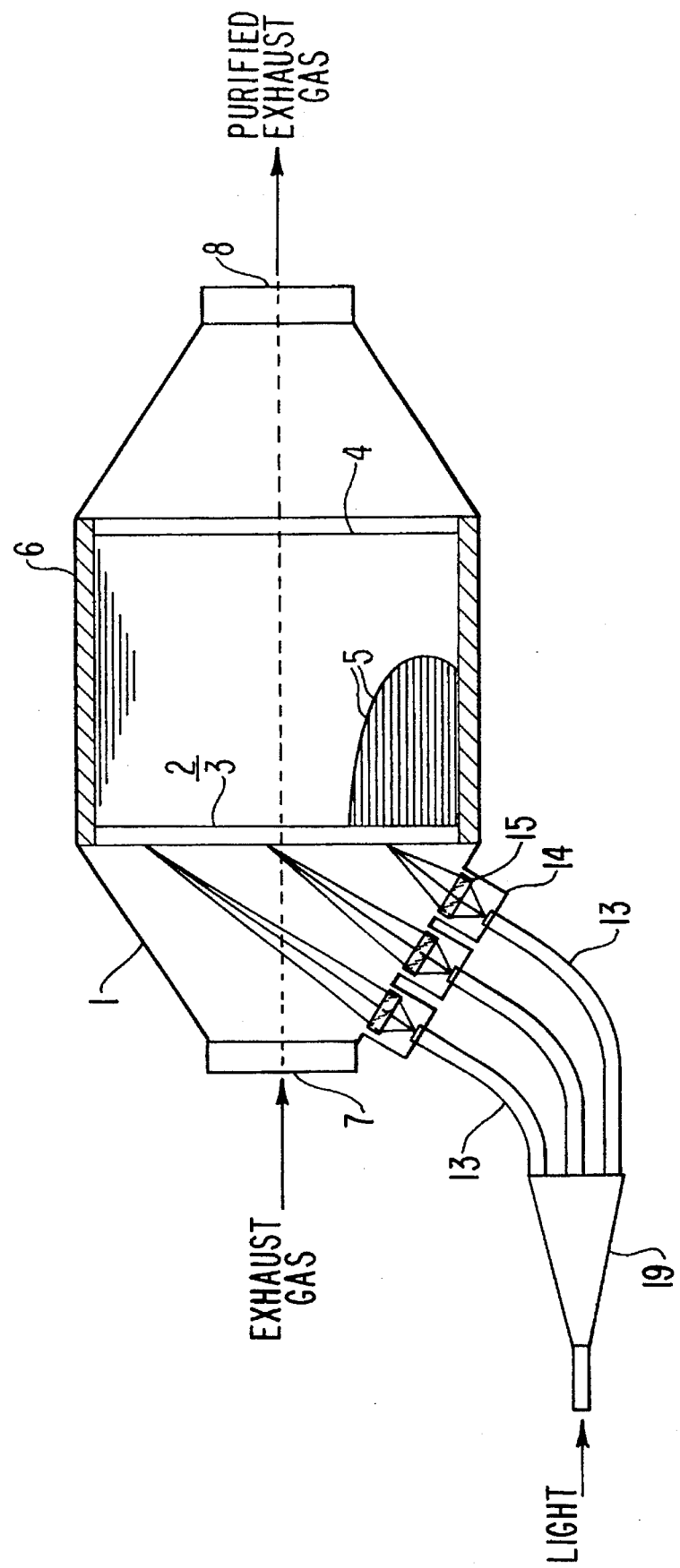
FIG. 5 is a schematic cross sectional view of a fifth embodiment of the present invention.

FIG. 5 shows a fifth embodiment, where three optical fibers 13 direct energy at isolated portions of the catalyst carrier entrance surface 3. One source of electromagnetic radiation, which has a visible or near-visible light frequency, is used, wherein its emissions are distributed to the optical fibers 13 by a splitter 19.

German priority application P 43 41 3808 is relied on and incorporated by reference herein.

Although the invention has been described and depicted with respect to FIGS. 1 through 5, those skilled in the art will appreciate and understand that several variations of those previously described may be made without departing from the scope and spirit of the present invention as claimed below.

What is claimed is:

1. The catalytic converter which provides enhanced emission conversion during start-up, said catalytic converter comprising:

a gas tight housing having an inlet and an outlet;

a catalyst carrier arranged within said housing between said inlet and said outlet such that exhaust gases pass through gas flow channels within said catalyst carrier, said catalyst carrier having a gas inlet area defined by a cross-section area of said gas flow channels; and a supplemental energy delivery source connected to said housing in a spaced apart relationship to said gas inlet area for providing energy to a portion of said gas inlet area of the catalyst carrier less than the cross-sectional area of said gas inlet area in order to heat said portion to a light-off temperature of a catalyst embedded in said carrier; wherein said supplemental energy source is a laser and the light emitted by said laser is directed to said heated portion of said gas inlet area by at least one fiber optic guide and wherein said energy is delivered for a predetermined period during start-up.

2. The catalytic converter claimed in claim 1, wherein two or more area of said gas inlet portion are heated.

3. The catalytic converter claimed in claim 1 wherein said portion at which supplemental energy is directed constitutes 0.01 to 20% of the total cross-sectional area of said gas inlet area.

4. The catalytic converter claimed in claim 1 wherein two or more lasers and fiber optic guides are provided.

5. The catalytic converter claimed in claim 1, wherein said catalyst carrier is made of a ceramic.

6. The catalytic converter claimed in claim 1, wherein said catalyst carrier is made of a metal.

7. A process for enhancing emission conversion in a catalytic converter during initial operation of the catalytic converter, said process comprising:

providing a catalytic converter having a catalyst carrier therein, and a supplemental energy source connected thereto;

directing energy from said supplemental energy source to a predetermined portion of a gas inlet area less than the total cross-sectional area of said flow through catalyst carrier;

heating said portion of said gas inlet area for a predetermined period of time in order to achieve light-off temperature at said portion, wherein said supplemental energy source is a laser and the light emitted by said laser is directed to said predetermined portion of said gas inlet area by at least one fiber optic guide.

8. The process claimed in claim 7, wherein the predetermined portion of the gas inlet area is a portion at which conversion reactions initially begin when said catalytic converter is operated alone without supplemental energy provision.

9. The process as claimed in claim 7, wherein said light-off temperature is between 250° and 400° C.

10. The process as claimed in claim 7, wherein the predetermined is between 10 and 20 seconds.

* * * * *